(12) United States Patent
Zhao et al.

(10) Patent No.: US 9,823,484 B2
(45) Date of Patent: Nov. 21, 2017

(54) ELECTROCHROMIC GRATING AND 3D DISPLAY DEVICE

(71) Applicants: BOE TECHNOLOGY GROUP CO., LTD., Beijing (CN); Beijing BOE Optoelectronics Technology Co., Ltd., Beijing (CN)

(72) Inventors: Wenqing Zhao, Beijing (CN); Xue Dong, Beijing (CN); Xi Chen, Beijing (CN); Xiaochuan Chen, Beijing (CN); Changfeng Li, Beijing (CN); Ming Yang, Beijing (CN); Haisheng Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/126,282

(22) PCT Filed: Sep. 23, 2015

(86) PCT No.: PCT/CN2015/090366
§ 371 (c)(1),
(2) Date: Sep. 14, 2016

(87) PCT Pub. No.: WO2016/123989
PCT Pub. Date: Aug. 11, 2016

(65) Prior Publication Data
US 2017/0082864 A1    Mar. 23, 2017

(30) Foreign Application Priority Data
Feb. 6, 2015 (CN) .......................... 2015 1 0064933

(51) Int. Cl.
*G02F 1/15* (2006.01)
*G02B 27/22* (2006.01)
(Continued)

(52) U.S. Cl.
CPC ............ *G02B 27/2214* (2013.01); *G02B 5/18* (2013.01); *G02F 1/153* (2013.01); *G02F 1/155* (2013.01);
(Continued)

(58) Field of Classification Search
CPC .......... G02F 1/15; G02F 1/1506; G02F 1/157; G02F 2001/151; G02F 2001/1512;
(Continued)

(56) References Cited

U.S. PATENT DOCUMENTS

2016/0182899 A1* 6/2016 Liu .................... G02F 1/155
348/54

FOREIGN PATENT DOCUMENTS

CN    1492274 A    4/2004
CN    102338960 A    2/2012
(Continued)

OTHER PUBLICATIONS

International Search Report and Written Opinion (including English translations) dated Dec. 25, 2015, for corresponding PCT Application No. PCT/CN2015/090366.
(Continued)

*Primary Examiner* — William Choi
(74) *Attorney, Agent, or Firm* — Kinney & Lange, P.A.

(57) ABSTRACT

The disclosure relates to a 3D display device. The 3D display device includes a display panel and an electrochromic grating that is located on a light output side of the display panel; wherein the electrochromic grating comprises: a first transparent electrode layer, an electrochromic layer, a solid electrolyte layer and a second transparent
(Continued)

electrode layer that are overlapped on a substrate of the display panel in sequence. As the solid electrolyte layer is used replacing the process in prior art that an upper and lower glasses substrates are used to package the electrochromic grating and thus avoiding complex packaging process, the 3D display device can be thinned. Further, as the electrochromic grating is directly formed on the substrate of the display panel, alignment between the electrochromic grating and the sub-pixels in the display panel can be more simple and accurate.

20 Claims, 7 Drawing Sheets (51) Int. Cl.
*G02F 1/153* (2006.01)
*G02F 1/155* (2006.01)
*G02B 5/18* (2006.01)

(52) U.S. Cl.
CPC .......... *G02F 1/1508* (2013.01); *G02F 1/1521* (2013.01); *G02F 1/1533* (2013.01); *G02F 2001/1515* (2013.01); *G02F 2201/30* (2013.01)

(58) Field of Classification Search
CPC ..... G02F 2001/1515; G02F 2001/1517; G02F 2001/1519; G02F 2001/1552; G02F 2001/1555; G02F 2001/1557; G02F 1/155; G02F 1/153; G02F 2001/1502

USPC .................................................. 359/265–275
See application file for complete search history.

(56) References Cited

FOREIGN PATENT DOCUMENTS

| CN | 102478739 A | 5/2012 |
|---|---|---|
| CN | 102955260 A | 3/2013 |
| CN | 102967979 A | 3/2013 |
| CN | 202948233 U | 5/2013 |
| CN | 103152594 A | 6/2013 |
| CN | 103376556 A | 10/2013 |
| CN | 103969871 A | 8/2014 |
| CN | 104076569 A | 10/2014 |
| CN | 104181720 A | 12/2014 |
| CN | 104238226 A | 12/2014 |
| CN | 104252044 A | 12/2014 |
| CN | 104570371 A | 4/2015 |

OTHER PUBLICATIONS

First Chinese Office Action dated May 24, 2016, for corresponding Chinese Application No. 201510064933.1.
Second Chinese Office Action, for Chinese Patent Application No. 2015100649331, dated Oct. 26, 2016, 7 pages.
Decision of Rejection for Chinese Patent Application No. 201510064933.1, dated May 5, 2017.
Third Chinese Office Action, for Chinese Patent Application No. 201510064933.1, dated Jan. 6, 2017, 7 pages.

\* cited by examiner

ELECTROCHROMIC GRATING AND 3D DISPLAY DEVICE

CROSS-REFERENCE TO RELATED APPLICATIONS

This application is a Section 371 National Stage Application of International Application No. PCT/CN2015/090366, filed on Sep. 23, 2015, entitled "Electrochromic grating and 3D display device", which claims priority to Chinese Application No. 201510064933.1, filed on Feb. 6, 2015, incorporated herein by reference in their entirety.

BACKGROUND

1. Technical Field

Embodiments of the present invention relate to field of display technology, and particularly to a three-dimension display device.

2. Description of the Related Art

Three-dimension display is becoming a trend in display field due to its fidelity and is coming into people's life. Currently, 3D display may be classified into two types, i.e., naked-eye and eyeglasses-aid types. An eyeglasses-aid type 3D display technology requires user to wear specific glasses so that it is not convenient in terms of portability. Thus, a product such as a flat panel or a mobile phone is developed to adopt the naked-eye type 3D display technology. Current naked-eye type 3D display technology mainly includes grating 3D display and lens 3D display. The naked-eye type lens 3D display technology is generally not compatible with liquid crystal display screen or organic electroluminescent display screen. Thus, panel manufacturer pay attention to the naked-eye type grating 3D display technology.

In the grating 3D display technology, light at a certain angle is limited by using an entire column of opaque material such that left eye can only watch a left-eye image and right eye can only watch a right-eye image, establishing a 3D image. Currently, a conventional electrochromic grating has a basic structure including five layers: a first glass substrate, a first transparent electrode layer, an electrochromic layer, a second transparent electrode layer and a second glass substrate. Electrochromic material is generally in a liquid state. Thus, the first glass substrate and the second glass substrate are needed to be assembled to be packaged such that the electrochromic grating is formed as an external component of 3D display device, and thus the packaging process is complex, and the obtained 3D display device is rather thick. Further, as the electrochromic grating is formed as an external component, it is possible to cause errors when the electrochromic grating is aligned with the respective sub-pixels of the display panel and positioned, thereby rendering a degraded accuracy.

Therefore, it is a challenge for those skilled in the art how to reduce the entire thickness of a 3D display device and accurately align the electrochromic grating with the respective sub-pixels of the display panel.

SUMMARY

Embodiments of the present invention provide a 3D display device to reduce thickness of the 3D display device and more accurately align the electrochromic grating with the respective sub-pixels of a display panel, improving display performance. Embodiments of the invention further provide an electrochromic grating which can be mounted on a light output side of the display device so as to achieve a 3D display.

According an aspect of the invention, there is provided an electrochromic grating configured to dispose at a light output side of a display panel, the electrochromic grating comprising: a first transparent electrode layer, an electrochromic layer, a solid electrolyte layer and a second transparent electrode layer that are overlapped on a substrate of the display panel in sequence, the solid electrolyte layer having a high ion conductivity and a high transmission and being configured to supply ions to the electrochromic layer.

According to an aspect of the present invention, there is provided a 3D display device, comprising a display panel and an electrochromic grating that is located on a light output side of the display panel; wherein the electrochromic grating comprises: a first transparent electrode layer, an electrochromic layer, a solid electrolyte layer and a second transparent electrode layer that are overlapped on a substrate of the display panel in sequence.

BRIEF DESCRIPTION OF THE DRAWINGS

FIG. 3b is a schematic view of regions where a first group of sub-pixels and a second group of sub-pixels are located in the arrangement manner of the sub-pixels as shown in FIG. 3a;

FIG. 3d is a second schematic view of regions where the first group of sub-pixels and the second group of sub-pixels are located in the arrangement manner of the sub-pixels as shown in FIG. 3a;

FIG. 4b is a first schematic view of regions where the first group of sub-pixels and the second group of sub-pixels are located in the arrangement manner of the sub-pixels as shown in FIG. 4a;

FIG. 4d is a second schematic view of regions where the first group of sub-pixels and the second group of sub-pixels are located in the arrangement manner of the sub-pixels as shown in FIG. 4a;

FIG. 4f is a third schematic view of regions where the first group of sub-pixels and the second group of sub-pixels are located in the arrangement manner of the sub-pixels as shown in FIG. 4a.

DETAILED DESCRIPTION OF THE EMBODIMENTS

A further description of a three-dimensional (3D) display device provided by the present disclosure will be made as below with reference to embodiments of the present invention taken in conjunction with the accompanying drawings. A thickness and shape of each of films or layers in the drawings herein are not intended to represent an actual scale of the 3D display device, but to indicate content of the invention. Wordings of "first" and "second" do not represent any meanings of "priority" or "order", but are intended to provide different names for different components.

Figure 1:
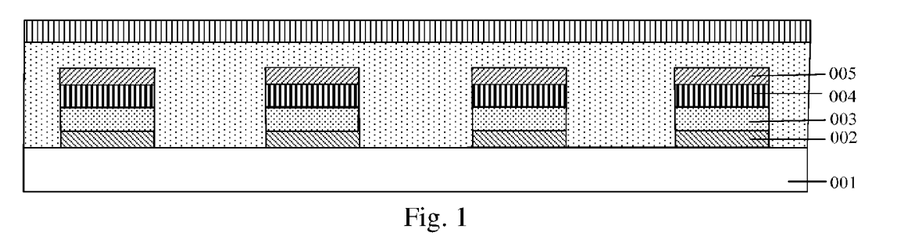
FIG. 1 is a first structural schematic view of a 3D display device provided by embodiments of the present invention.

Embodiments of the present invention provide a 3D display device. As shown in FIG. 1, the 3D display device comprises: a display panel and an electrochromic grating located at a light output side of the display panel The electrochromic grating comprises a first transparent electrode layer 002, an electrochromic layer 003, a solid electrolyte layer 004 and a second transparent electrode layer 005 that are overlapped in sequence and arranged on a substrate 001 of the display panel. That is, the electrochromic grating is arranged at a side of the substrate of the display panel away from liquid crystal.

In a specific implementation, the display panel may be a liquid crystal display panel, an organic electroluminescent display panel or a display panel in other form. The display panel is not limited.

With the electrochromic grating provided according to the embodiments of the present invention, packaging of a electrochromic grating using an upper glass substrate and a lower glass substrate in prior art may be replaced due to usage of a solid electrolyte layer, thereby avoiding a complex packaging process and achieving a thinned 3D display device. Further, as the electrochromic grating is directly formed on the substrate of the display panel, the electrochromic grating can be simply and accurately aligned with respective sub-pixels in the display panel.

In a specific implementation, in the 3D display device provided by the embodiment of the present invention, the solid electrolyte layer may be made of various materials. Specifically, the solid electrolyte layer may be made of at least one solid lithium salt or solid polymer containing lithium. As the material has a high ion conductivity and transmission, the solid electrolyte layer made of the material can supply ions to the electrochromic layer, functioning as a transmission passage.

In a specific implementation, in the 3D display device provided by the embodiment of the present invention, the solid lithium salt may include $LiNbO_3$ and/or $LiTaO_3$; the solid polymer containing lithium may include $PEO$-$LiCF_3SO_3$ and/or $PEO$-$LiClO_4$—$Al_2O_3$. The 3D display device can be further thinned by selecting a suitable solid lithium salt or solid polymer containing lithium. However, the specific material for forming the solid electrolyte layer is not limited herein.

Figure 2:
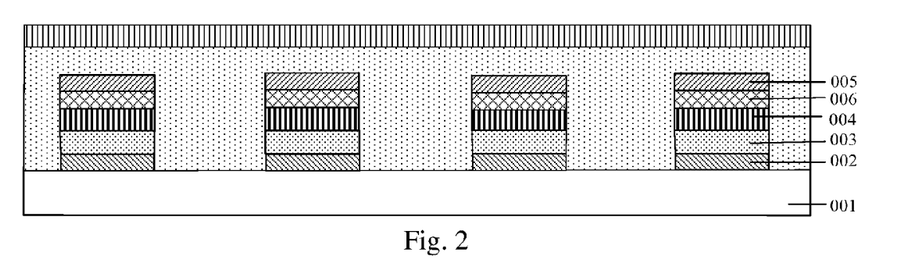
FIG. 2 is a second structural schematic view of the 3D display device provided by embodiments of the present invention.

In a specific implementation, in the 3D display device provided by the embodiment of the present invention, as shown in FIG. 2, for the purpose of saving energy, the electrochromic grating further includes an electrochromic storage layer 006 which may be arranged between the solid electrolyte layer and the second transparent electrode layer. The electrochromic storage layer 006 may function to store ions to balance charge transmission, thereby achieving bistable operation, i.e., achieving stable operation states in both a dark state and a transparent state, and enabling the electrochromic grating to be stably operated so as to save energy and improve display performance.

In a specific implementation, in the 3D display device provided by the embodiment of the present invention, the electrochromic storage layer is generally made of a reversible oxidation-reduction material to balance charge transmission. Specifically, the electrochromic storage layer may be made of one of $TiO_2$, $V_2O_5$, $CeO_2$, and $ZnO$, or a combination thereof. However, the specific material for the electrochromic storage layer is not limited herein.

In a specific implementation, it is to be noted that the material for forming the electrochromic storage layer and the material for forming the electrochromic layer exhibit reverse states in terms of an oxidation state and a reduction state, that is, the material of the electrochromic storage layer gains electrons while the material of the electrochromic layer loses electrons, and the material of the electrochromic storage layer loses electrons while the material of the electrochromic layer gains electrons. Specifically, materials for forming the electrochromic layer may be classified into two groups, i.e., an organic material and an inorganic material. The organic material includes viologen compound or polymer. The polymer includes polyaniline, polypyrrole, or polythiophene; and the inorganic material includes an anodically coloring electrochromic material or a cathodically coloring electrochromic material. The anodically coloring electrochromic material includes $NiO$, $IrOx$, $CoO_3$, $Rh_2O_3$ or $MnO$ and the cathodically coloring electrochromic material includes $WO_3$, $MoO_3$, $V_2O_3$, $NbO_3$ or $BiO_3$. However, the specific material of the electrochromic layer is not limited herein.

In a specific implementation, in the 3D display device provided by the embodiment of the present invention, the sub-pixels in the display panel may be arranged in a normal structure in a proportion of 1:3 (a ratio of length to width of the structure) or in an abnormal structure. Resolution of the display device can be improved in combination with a particular arithmetic. That is, in order to improve resolution of the 3D display device, sub-pixels in the display panel may be arranged in virtual pixels and the sub-pixels are classified into a first group of sub-pixels to display a left-eye image and a second group of sub-pixels to display a right-eye image; and light blocking regions formed by regions in the electrochromic grating where the electrochromic layer is located are in one-to-one correspondence to regions where the first group of sub-pixels or the second group of sub-pixels are located.

It is to be noted that there are various arrangements of the virtual pixels and the regions where the first group of sub-pixels and the second group of sub-pixels of the sub-pixels are located respectively may be distributed in various ways in the case that the same arrangement of the virtual pixels is adopted. A pattern of the light blocking regions of the electrochromic grating may vary depending on the arrangements of the virtual pixels and distributions of the regions where the first group of sub-pixels and the second group of sub-pixels are located respectively. Several specific examples are illustrated below.

Figure 3A:
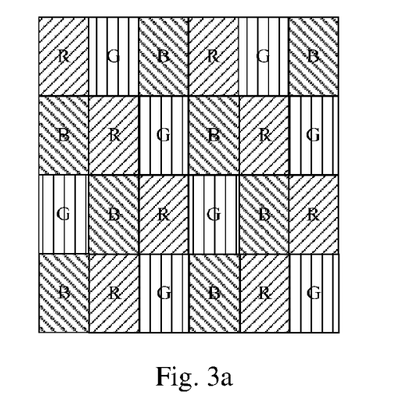
FIG. 3a is a first schematic view of arrangement manner of sub-pixels in a display panel provided by embodiments of the present invention.

In a specific implementation, in the 3D display device provided by the embodiment of the present invention, a virtual pixel arrangement manner is illustrated in FIG. 3a, in which two adjacent sub-pixels in the display panel have different colors from each other (R represents red, G represents green and B represents blue in FIG. 3a) and the sub-pixels are arranged to be aligned with one another both in a row direction and in a column direction. For example, as shown in FIG. 3a, a sub-pixel has an adjacent sub-pixel in the row direction and an adjacent sub-pixel in the column direction. When the sub-pixel has a red color R, the adjacent sub-pixel in the row direction has a green color G and the adjacent sub-pixel in the column direction has a blue color B.

Figure 3B:
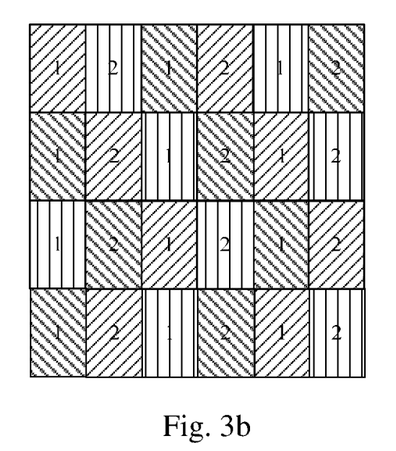
Figure 3C:
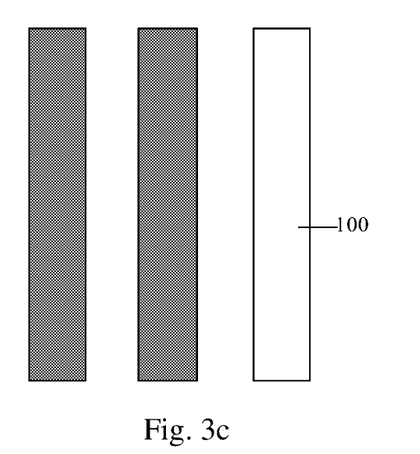
FIG. 3c is a schematic view of light blocking regions of the electrochromic grating corresponding to FIG. 3b.

In a specific implementation, in the 3D display device provided by the embodiment of the present invention as shown in FIG. 3b, the first group of sub-pixels 1 and the second group of sub-pixels 2 are respectively arranged in the column direction and have different colors from each other. As the light blocking regions of the electrochromic grating are in one-to-one correspondence to regions where the first group of sub-pixels 1 or the second group of sub-pixels 2 are located, as shown in FIG. 3c, the light blocking regions in the electrochromic grating 100 are formed in a pattern constituted by vertical strips.

Figure 3D:
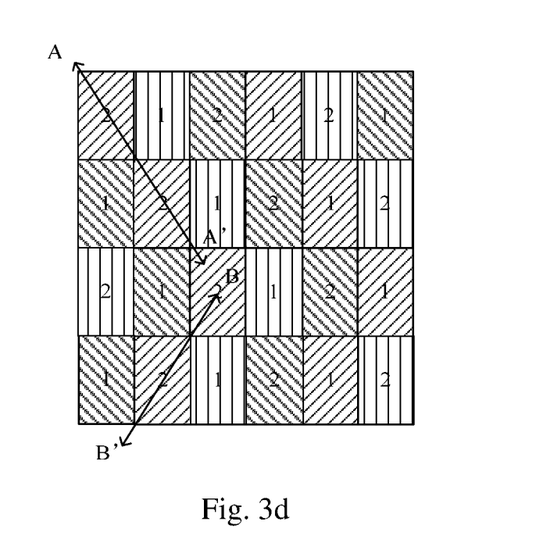
Figure 3E:
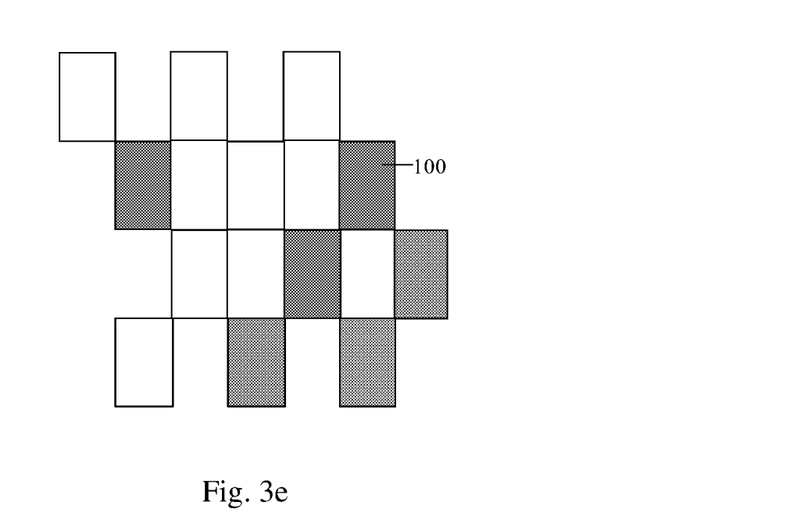
FIG. 3e is a schematic view of the light blocking regions of the electrochromic grating corresponding to FIG. 3d.

In the second embodiment, as shown in FIG. 3d, the first group of sub-pixels 1 and the second group of sub-pixels 2 are arranged respectively in a diagonal line AA' or BB' direction and have the same color respectively. When the first group of sub-pixels 1 or the second group of sub-pixels 2 are arranged alternately in the diagonal line AA' and BB' directions, they form a polygonal line. As the light blocking regions in the electrochromic grating are in one-to-one correspondence to regions where the first group of sub-pixels 1 or the second group of sub-pixels 2 are located, the light blocking regions of the electrochromic grating 100 are formed in a pattern constituted by polygonal line-shaped strips as shown in FIG. 3e.

Figure 4A:
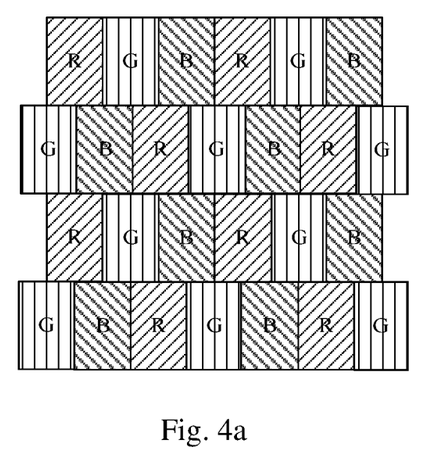
FIG. 4a is a second schematic view of arrangement manner of the sub-pixels in the display panel according to embodiments of the present invention.

In a specific implementation, in the 3D display device provided by the embodiment of the present invention, another virtual pixel arrangement manner is illustrated in FIG. 4a, in which two adjacent sub-pixels in the display panel have different colors from each other (in FIG. 4a, R represents red, G represents green and B represent blue) and sub-pixels in two adjacent sub-pixel rows are respectively offset from each other in the row direction by a half of a dimension of one sub-pixel. It is to be noted that a half of a dimension of one sub-pixel does not mean an exact half of the dimension of one sub-pixel, but may be larger than or equal to a half of the dimension of one sub-pixel and less than the dimension of one sub-pixel. For example, as shown in FIG. 4a, one sub-pixel has adjacent sub-pixels that are in the same sub-pixel row as the one sub-pixel, in a sub-pixel column at a left side of the one sub-pixel and in a sub-pixel column at a right side of the one sub-pixel, respectively. When the one sub-pixel has a red color R, the adjacent sub-pixel in the same sub-pixel row as the one sub-pixel has a green color G, the adjacent sub-pixel in the sub-pixel column at the left side has a green color G, and the adjacent sub-pixel in the sub-pixel column at the right side has a blue color B.

Figure 4B:
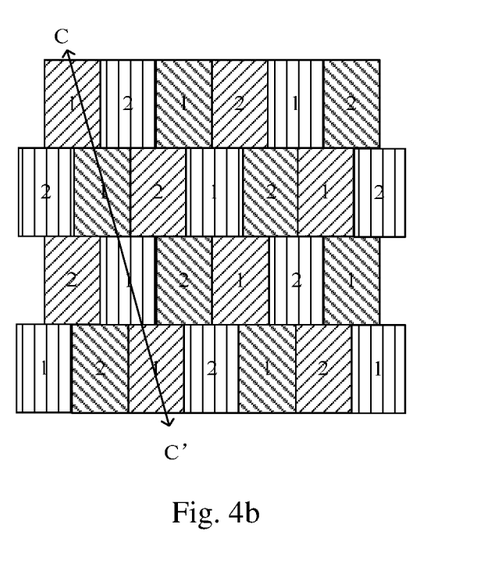
Figure 4C:
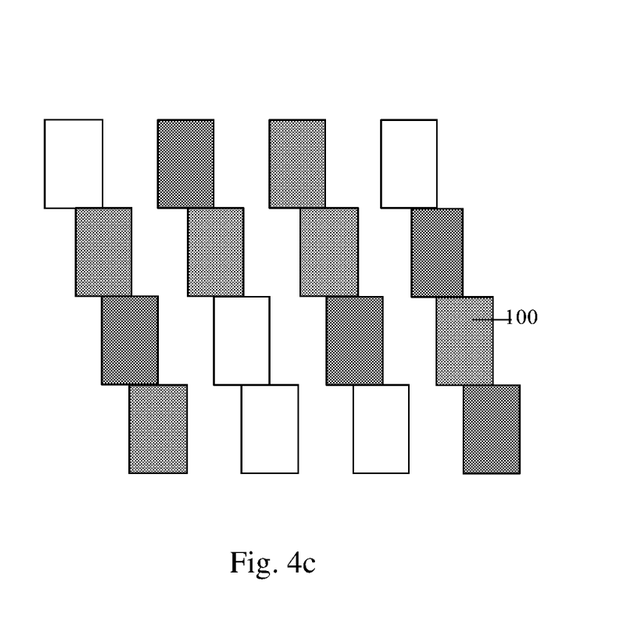
FIG. 4c is a schematic view of the light blocking regions of the electrochromic grating corresponding to FIG. 4b.

In a specific implementation, in the 3D display device provided by the first embodiment of the present invention, as shown in FIG. 4b, the first group of sub-pixels 1 and the second group of sub-pixels 2 are respectively arranged in a single diagonal line direction, i.e., a diagonal line CC' direction inclined rightwards, and have different colors from each other. As the light blocking regions in the electrochromic grating are respectively in one-to-one correspondence to the regions where the first group of sub-pixels 1 or the second group of sub-pixels 2 are located, the light blocking regions in the electrochromic grating 100 are formed in a pattern constituted by strips inclined rightwards as shown in FIG. 4c.

Figure 4D:
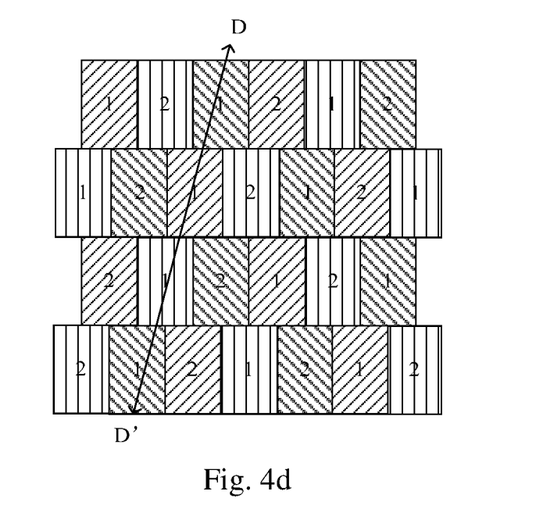
Figure 4E:
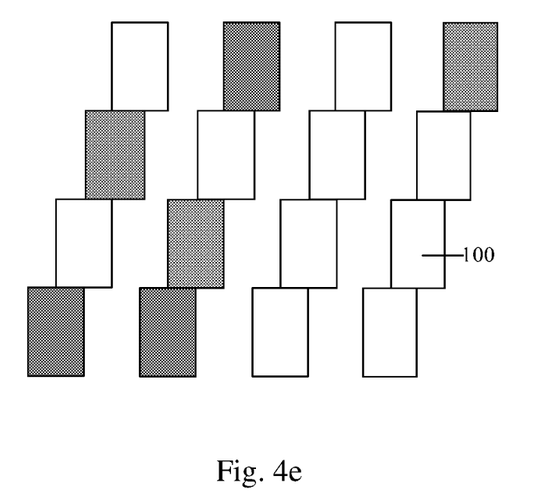
FIG. 4e is a schematic view of the light blocking regions of the electrochromic grating corresponding to FIG. 4d.

In the second embodiment, as shown in FIG. 4d, the first group of sub-pixels 1 and the second group of sub-pixels 2 are respectively arranged in a single diagonal line direction, i.e., a diagonal line DD' direction inclined leftwards, and have different colors from each other. As the light blocking regions in the electrochromic grating are respectively in one-to-one correspondence to the regions where the first group of sub-pixels 1 or the second group of sub-pixels 2 are located, the light blocking regions in the electrochromic grating 100 are formed in a pattern constituted by strips inclined leftwards as shown in FIG. 4e.

Figure 4F:
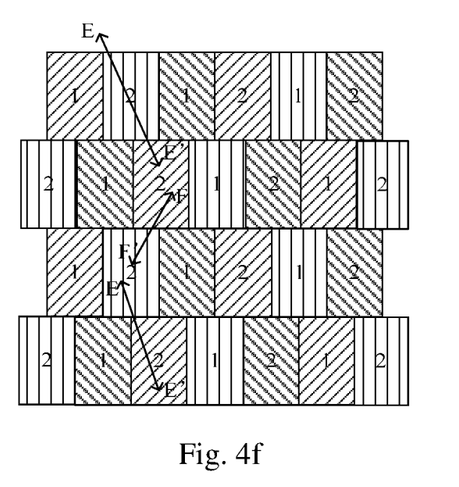
Figure 4G:
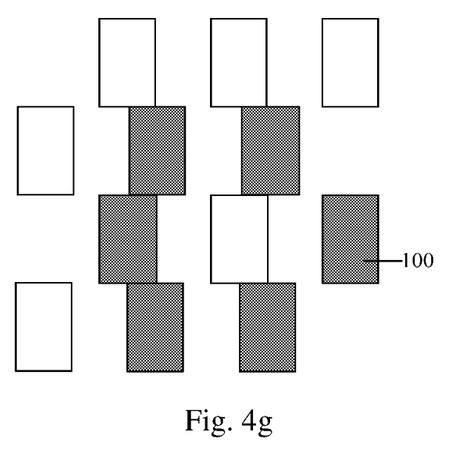
FIG. 4g is a schematic view of the light blocking regions of the electrochromic grating corresponding to FIG. 4f.

In the third embodiment, as shown in FIG. 4f, the first group of sub-pixels 1 and the second group of sub-pixels 2 are respectively arranged in a diagonal line EE' or FF' direction, and have different colors from each other. When the first group of sub-pixels 1 or the second group of sub-pixels 2 are alternately arranged in the diagonal line EE' and FF' directions, a polygonal line is formed. As the light blocking regions in the electrochromic grating are respectively in one-to-one correspondence to the regions where the first group of sub-pixels 1 or the second group of sub-pixels 2 are located, the light blocking regions in the electrochromic grating 100 are formed in a pattern constituted by polygonal line-shaped strips as shown in FIG. 4g.

In the above embodiments, according to two different arrangements of the virtual pixels and different distributions of the regions where the first group of sub-pixels 1 and the second group of sub-pixels 2 are located, the light blocking regions in the electrochromic grating are formed in the above several patterns, all of which can effectively improve resolution of the 3D display device. In a specific implementation, a suitable embodiment can be designed as required and is not limited herein. of course, the 3D display device can be implemented not only in the above embodiments but also in other embodiments, provided the sub-pixels in the display panel are arranged in the virtual pixels and the sub-pixels are classified into the first group of sub-pixels configured to display the left-eye picture and the second group of sub-pixels configured to display the right-eye picture and the light blocking regions in the electrochromic grating are respectively in one-to-one correspondence to the regions where the first group of sub-pixels or the second group of sub-pixels are located. The implementation of 3D display device is not limited herein.

A 3D display device provided according to embodiments of the present invention comprises a display panel and an electrochromic grating that is located on a light output side of the display panel, wherein the electrochromic grating comprises a first transparent electrode layer, an electrochromic layer, a solid electrolyte layer and a second transparent electrode layer that are overlapped on the substrate of the display panel in sequence. Due to usage of the solid electrolyte layer, package of an electrochromic grating by using the upper glass substrate and the below glass substrate in prior art can be replaced, a complex packaging process can be avoided and a thinned 3D display device can be achieved. Further, as the electrochromic grating is directly formed on the substrate of the display panel, the electrochromic grating can be simply and accurately aligned with respective sub-pixels in the display panel.

Obviously, it is obvious to modify and change the embodiments of the present invention without departing from inspirit and scope of the present invention. These modification and change to the embodiments of the present invention shall be covered in the scope of the present invention if they fall within the scope of the claims and equivalents.

The invention claimed is:

1. An electrochromic grating configured to be disposed at a light output side of a display panel, the electrochromic grating comprising:
   a first transparent electrode layer, an electrochromic layer, a solid electrolyte layer and a second transparent electrode layer that are overlapped on a substrate of the display panel in sequence, the solid electrolyte layer having a high ion conductivity and a high transmission and being configured to supply ions to the electrochromic layer.

2. The electrochromic grating as claimed in claim 1, wherein the solid electrolyte layer is made of at least one solid lithium salt or solid polymer containing lithium.

3. The electrochromic grating as claimed in claim 1, wherein:
the solid electrolyte layer is made of solid lithium salt comprising $LiNbO_3$ and/or $LiTaO_3$; or
the solid electrolyte layer is made of solid polymer containing lithium that comprises $PEO-LiCF_3SO_3$ and/or $PEO-LiClO_4$—$Al_2O_3$.

4. The electrochromic grating as claimed in claim 1, wherein the electrochromic grating further comprises an electrochromic storage layer arranged between the solid electrolyte layer and the second transparent electrode layer and configured to store ions to balance charge transmission.

5. The electrochromic grating as claimed in claim 4, wherein the electrochromic storage layer is made of one of $TiO_2$, $V_2O_5$, $CeO_2$ and $ZnO$, or a combination thereof.

6. The electrochromic grating as claimed in claim 4, wherein the electrochromic layer and the electrochromic storage layer are configured such that a material of the electrochromic storage layer loses electrons while a material of the electrochromic layer gains electrons, or the material of the electrochromic storage layer gains electrons while the material of the electrochromic layer loses electrons.

7. The electrochromic grating as claimed in claim 1,
wherein sub-pixels in the display panel are arranged in virtual pixels and classified into a first group of sub-pixels to display a left-eye image and a second group of sub-pixels to display a right-eye image; and
wherein light blocking regions formed by regions in the electrochromic grating where the electrochromic layer is located are in one-to-one correspondence to regions where the first group of sub-pixels or the second group of sub-pixels are located.

8. The electrochromic grating as claimed in claim 7, wherein two adjacent sub-pixels in the display panel have different colors from each other and the sub-pixels are arranged to be aligned with one another in both a row direction and a column direction.

9. The electrochromic grating as claimed in claim 8, wherein
the first group of sub-pixels and the second group of sub-pixels are respectively arranged in the column direction and have different colors from each other and the light blocking regions of the electrochromic grating are formed in a pattern constituted by vertical strips; or
the first group of sub-pixels and the second group of sub-pixels are respectively arranged in a diagonal line direction and have the same color and the light blocking regions of the electrochromic grating are formed in a pattern constituted by polygonal line-shaped strips.

10. The electrochromic grating as claimed in claim 7, wherein two adjacent sub-pixels in the display panel have different colors from each other and sub-pixels in adjacent sub-pixel rows are respectively offset from one another in a column direction by a half of a dimension of one sub-pixel.

11. The electrochromic grating as claimed in claim 10, wherein
the first group of sub-pixels and the second group of sub-pixels are respectively arranged in a single diagonal line direction and have different colors from each other and the light blocking regions of the electrochromic grating are formed in a pattern constituted by inclined strips; or
the first group of sub-pixels and the second group of sub-pixels are respectively arranged in a diagonal line direction and have different colors from each other and the light blocking regions of the electrochromic grating are formed in a pattern constituted by polygonal line-shaped strips.

12. A 3D display device comprising a display panel and the electrochromic grating as claimed in claim 1 that is located on a light output side of the display panel.

13. The 3D display device as claimed in claim 12, wherein the solid electrolyte layer is made of at least one solid lithium salt or solid polymer containing lithium.

14. The 3D display device as claimed in claim 12, wherein the electrochromic grating further comprises an electrochromic storage layer arranged between the solid electrolyte layer and the second transparent electrode layer and configured to store ions to balance charge transmission.

15. The 3D display device as claimed in claim 14, wherein the electrochromic layer and the electrochromic storage layer are configured such that a material of the electrochromic storage layer loses electrons while a material of the electrochromic layer gains electrons, or the material of the electrochromic storage layer gains electrons while the material of the electrochromic layer loses electrons.

16. The 3D display device as claimed in claim 12,
wherein sub-pixels in the display panel are arranged in virtual pixels and classified into a first group of sub-pixels to display a left-eye image and a second group of sub-pixels to display a right-eye image; and
wherein light blocking regions formed by regions in the electrochromic grating where the electrochromic layer is located are in one-to-one correspondence to regions where the first group of sub-pixels or the second group of sub-pixels are located.

17. The 3D display device as claimed in claim 16, wherein two adjacent sub-pixels in the display panel have different colors from each other and the sub-pixels are arranged to be aligned with one another in both a row direction and a column direction.

18. The 3D display device as claimed in claim 17, wherein
the first group of sub-pixels and the second group of sub-pixels are respectively arranged in the column direction and have different colors from each other and the light blocking regions of the electrochromic grating are formed in a pattern constituted by vertical strips; or
the first group of sub-pixels and the second group of sub-pixels are respectively arranged in a diagonal line direction and have the same color and the light blocking regions of the electrochromic grating are formed in pattern constituted by polygonal line-shaped strips.

19. The 3D display device as claimed in claim 16, wherein two adjacent sub-pixels in the display panel have different colors from each other and sub-pixels in adjacent sub-pixel rows are respectively offset from one another in a row direction by a half of a dimension of one sub-pixel.

20. The 3D display device as claimed in claim 19, wherein
the first group of sub-pixels and the second group of sub-pixels are respectively arranged in a single diagonal line direction and have different colors from each other and the light blocking regions of the electrochromic grating are formed in a pattern constituted by inclined strips; or
the first group of sub-pixels and the second group of sub-pixels are respectively arranged in a diagonal line direction and have different colors from each other and the light blocking regions of the electrochromic grating are formed in a pattern constituted by polygonal line-shaped strips.

* * * * *